(12) United States Patent
Yoon

(10) Patent No.: US 11,034,537 B2
(45) Date of Patent: Jun. 15, 2021

(54) POSITIONING MODULE AND DRIVING CONTROL DEVICE OF CARRIER UNIT, INCLUDING SAME

(71) Applicant: OMOROBOT INC., Ansan-si (KR)

(72) Inventor: Seok-Hoon Yoon, Seoul (KR)

(73) Assignee: OMOROBOT INC., Ansan-si (KR)

( * ) Notice: Subject to any disclaimer, the term of this patent is extended or adjusted under 35 U.S.C. 154(b) by 579 days.

(21) Appl. No.: 15/927,789

(22) Filed: Mar. 21, 2018

(65) Prior Publication Data

US 2018/0208423 A1 Jul. 26, 2018

Related U.S. Application Data

(63) Continuation of application No. PCT/KR2016/010933, filed on Sep. 29, 2016.

(30) Foreign Application Priority Data

| Oct. 2, 2015 | (KR) | 10-2015-0138848 |
| Jan. 14, 2016 | (KR) | 10-2016-0004636 |
| May 13, 2016 | (KR) | 10-2016-0058816 |

(51) Int. Cl.
*G01B 5/24* (2006.01)
*B65H 16/02* (2006.01)
(Continued)

(52) U.S. Cl.
CPC ........... *B65H 16/025* (2013.01); *B62D 51/04* (2013.01); *G01B 5/008* (2013.01); *G01B 5/02* (2013.01);
(Continued)

(58) Field of Classification Search
CPC ................. B25H 16/025; G01B 5/02
(Continued)

(56) References Cited

U.S. PATENT DOCUMENTS

| 5,286,972 A * | 2/1994 | Falk | G01B 3/11 |
| | | | 250/231.16 |
| 6,785,973 B1 * | 9/2004 | Janssen | G01B 5/004 |
| | | | 33/1 N |

(Continued)

FOREIGN PATENT DOCUMENTS

| JP | H07-013005 U | 3/1995 |
| JP | H09-005006 A | 1/1997 |

(Continued)

OTHER PUBLICATIONS

International Search Report; issued in PCT/KR2016/010933; dated Jan. 24, 2017.

(Continued)

*Primary Examiner* — George B Bennett
(74) *Attorney, Agent, or Firm* — Studebaker & Brackett PC

(57) ABSTRACT

The present invention relates to a positioning module and a driving control device of carrier unit with the positioning module. In the present invention, the positioning module calculates the unwinding length and unwinding angle of a wire which is unwound by an external force. Then, the positioning module sequentially calculates location information of some points on the wire and the speed of the wire. When the speed exceeds the threshold value, the positioning module generates a control signal corresponding to the number of times where the speed exceeds the threshold value, by using the unwinding length and the unwinding angle.

10 Claims, 15 Drawing Sheets

(51) Int. Cl.
    *G01B 21/22* (2006.01)
    *H02J 7/02* (2016.01)
    *G01B 21/02* (2006.01)
    *G06F 3/01* (2006.01)
    *G01D 5/00* (2006.01)
    *G05D 1/02* (2020.01)
    *G05D 1/00* (2006.01)
    *B62D 51/04* (2006.01)
    *G01B 5/008* (2006.01)
    *G01B 5/02* (2006.01)

(52) U.S. Cl.
    CPC ............ *G01B 21/02* (2013.01); *G01B 21/22* (2013.01); *G01D 5/00* (2013.01); *G05D 1/00* (2013.01); *G05D 1/02* (2013.01); *G06F 3/01* (2013.01); *H02J 7/02* (2013.01)

(58) Field of Classification Search
    USPC .................................................. 33/1 PT, 756
    See application file for complete search history.

(56) References Cited

U.S. PATENT DOCUMENTS

| | | | | |
|---|---|---|---|---|
| 7,569,808 | B2* | 8/2009 | Yoshioka | G01D 5/34738 250/231.14 |
| 7,841,246 | B2* | 11/2010 | Swanson | B65H 61/00 73/862.44 |
| 8,161,660 | B2* | 4/2012 | Swanson | G01B 7/30 33/756 |
| 8,726,529 | B2* | 5/2014 | Brosz | G01D 5/34738 33/1 N |
| 9,212,889 | B2* | 12/2015 | Teune | G01B 5/004 |
| 2011/0131008 | A1* | 6/2011 | Swanson | G01B 5/008 702/152 |
| 2015/0118868 | A1 | 4/2015 | Choi et al. | |
| 2018/0172417 | A1* | 6/2018 | Umbricht | G01B 11/06 |
| 2020/0182598 | A1* | 6/2020 | Lowitz | G01B 3/56 |

FOREIGN PATENT DOCUMENTS

| | | |
|---|---|---|
| JP | 2001-004375 A | 1/2001 |
| KR | 10-0338187 B1 | 5/2002 |
| KR | 10-2009-0046560 A | 5/2009 |
| KR | 10-2013-0122272 A | 11/2013 |
| KR | 10-2015-0047780 A | 5/2015 |

OTHER PUBLICATIONS

Written Opinion; issued in PCT/KR2016/010933; dated Jan. 24, 2017.

An Office Action issued by the Korean Intellectual Property Office dated Dec. 1, 2015, which corresponds to Korean Patent Application No. 10-2015-0138848.

An Office Action issued by the Korean Intellectual Property Office dated Sep. 20, 2017, which corresponds to Korean Patent Application No. 10-2016-0004636.

An Office Action issued by the Korean Intellectual Property Office dated Jan. 6, 2018, which corresponds to Korean Patent Application No. 10-2016-0058816.

* cited by examiner

POSITIONING MODULE AND DRIVING CONTROL DEVICE OF CARRIER UNIT, INCLUDING SAME

CROSS-REFERENCE TO RELATED APPLICATIONS

The present application is a continuation of International Patent Application No. PCT/KR2016/010933, filed on Sep. 29, 2016, which claims benefit of priority to Korean Patent Application Nos. 10-2015-0138848, filed on Oct. 2, 2015, 10-2016-0004636, filed on Jan. 14, 2016 and 10-2016-0058816, filed on May 13, 2016, the entire content of which is incorporated herein by reference.

AREA OF THE TECHNOLOGY

The present invention relates to positioning module and driving control device of carrier unit, including same.

In the present invention, the positioning module calculates the unwinding length and unwinding angle of a wire which is unwound by an external force.

Then the positioning module sequentially calculates the location information of some points on the wire and speed of the wire by using the unwinding length and unwinding angle information calculated.

When the speed exceeds the threshold value, the positioning module generates a control signal that corresponds to the number of times where the speed exceeds the threshold value.

BACKGROUND OF THE INVENTION

In recent years, with the development of integrated circuit technology for electronic products and information processing apparatuses, general-purpose computer apparatuses and peripheral devices have been developed, but input devices for receiving signals from a user have shown little progress.

The input device refers to a device for inputting a signal to a computer device, and is also referred to as an input system. Unlike the way in which humans interpret and memorize information, computer devices process information by indicating it in the binary values of 0 and 1. Hence, the input device reads data such as characters, figures, voices, and numbers, and converts them into the binary values of 0 and 1 to be processed. While paper cards have been widely used as an input device in the early forms of computer devices, a typical input device nowadays is a keyboard for inputting characters and a mouse for pointing a location. Letters, numbers, or special characters that are input by a user in a computer device are converted into binary values of 0 and 1.

In addition, input devices include mice that point the location in various pictures or data displayed on the screen and joysticks that are used for playing games. An input device such as a touch screen is used for ATMs (automated teller machine), laptops, computers, hand-held devices, etc., where information is input by touching the screen with a finger or a pen.

Such conventional input devices can only be operated on a plane that is a two-dimensional space, and a user must input information by checking the information displayed on the display. More advanced types such as a finger mouse or a space mouse, controlled by a finger, are pricey or inconvenient to use.

Furthermore, as the frequency of using IT devices increases, a lot of time is spent on digitizing information.

Worse, since the mouse and the keyboard are not used simultaneously but rather used consecutively, input process is not very efficient in terms of time spent.

Meanwhile, as the unmanned and automated systems of manufacturing processes significantly increase due to the advancement of the industrial society, there is a growing need to minimize human intervention in the warehousing and transportation processes of cargoes. Therefore, equipment such as bogies and robots, which carry cargoes such as products and industrial goods, are rapidly being applied in the industrial field, and these transport equipment takes a pivotal role in unmanned and automated systems.

Generally such transport equipment automatically senses and moves along a guide rail or a conveyor belt built along the traveling path. This method is only practical for large-scale production lines or processes for mass production of products. Therefore, the method has a lot of limitations to be applied to transport in small work sites for small quantity, or lightweight items, and requires high cost for constructing a transport system.

In addition, the conventional transport equipment described above has disadvantages in that it is impossible to transport the goods to various places and spaces because the traveling path and the landing point are set in advance.

DETAILED DESCRIPTION OF THE INVENTION

Technical Challenge

The purpose of the present invention is to provide a positioning module that can calculate the changing location of a wire over time by calculating the unwinding length and unwinding angle of a wire which is unwound by an external force and using it to calculate the location information of some points on the wire.

Also, the purpose of the present invention is to provide a positioning module capable of calculating the speed based on the information on changing locations of a wire over time and generating a control signal corresponding to the number of times the speed exceeds the threshold value.

The purpose of the present invention is to provide a driving control device of carrier unit that can detach one side of the wire unwound from one side of the transport unit and one side of the operator.

Technical Solution

Positioning module in the present invention comprises:
a wire which is unwound by an external force;
a length calculation unit calculating the unwinding length when the wire is unwound;
an angle calculation unit calculating the unwinding angle when the wire is unwound; and
a location information calculation unit calculating the location information of at least one point on the wire, using the unwinding length and unwinding angle information calculated.

Preferably, a length calculation unit may comprise:
the first rotating member where the wire is unwound and rotates;
a rotating amount measurement sensor measuring the rotating amount of the first rotating member; and
a length calculation module calculating the unwinding length in proportion to the rotating amount.

Preferably, the angle calculation unit may comprise:
the second rotating part which rotates in a direction in which the wire is unwound;
a rotating angle measurement sensor measuring rotating angle of the second rotating member; and
an angle calculation module calculating a unwinding angle on the axis of rotation of the second rotating member using the rotating angle measured, Preferably, the rotating angle measurement sensor or the rotating amount measurement sensor may be either a potentiometer or an encoder.

Preferably, the location information calculation unit may calculate and save the information (X, Y coordinate) of at least a point on the wire on the coordinate system over time.

Preferably, the positioning module may further include a speed calculation unit calculating a speed value (V) using the moving distance (ΔL) of at least a point on the wire during a unit interval of time (ΔT).

Preferably, positioning module may further include a control signal generator generating a control signal by comparing the speed value that is calculated in the speed calculated unit, with the threshold value set in advance.

Preferably, the control signal generator may generate the control signal corresponding to the number of curves where the speed value exceeds the threshold value within the preset time.

Preferably, the control signal may either accelerate, decelerate or stop the traveling device.

Preferably, the location measurement module may further include a warning signal generator unit generating a warning signal when the unwinding length exceeds the preset length.

In addition, the driving control device of carrier unit in the present invention may comprise an operator, which is designed to be detachable from the distal end of the wire and the transport unit, equipped with a location measurement module comprising:
a wire which is unwound by external force;
a length calculation unit calculating an unwinding length of the wire; and
an angle calculation unit calculating an unwinding angle of the wire, and controls the travelling motion of the transport unit.
The operator can be designed to be charged by the power supplied from the outside.

Preferably, the first magnetic material and the second magnetic material are provided at the distal end of the wire and on one side of the operator respectively, and the driving control device of carrier unit can be detachable from the first magnetic material and the second magnetic material by magnetic force.

In this case, a metal plate, which is detachable from a magnetic material, by magnetic force and provided at a distal end of the wire, may be selectively positioned on the outside or inside of a point in the operator.

Preferably, the operator may comprise the first connecting groove receiving power from the outside and the first battery electrically connected to the first connecting groove.

Preferably, the operator may further include a connection jack protruding outward, and the connection jack may be connected to the second connecting groove formed in the transport unit.

Preferably, the transport unit may comprise the second battery electrically connected to the second connecting groove.

Preferably, magnetic materials of different polarities are provided on one side of the connection jack and one side of the second connecting groove respectively and are detachable from each other by the magnetic force of the magnetic material.

Preferably, the transport unit may further include a driving unit driven based on the control signals released by the location measurement module and the operator.

Preferably, the driving control device of carrier unit may further include:
an electric cable provided together with the wire;
one or more connecting pins protruding outward from one side of the first magnetic material; and
one or more connecting grooves on one side of the second magnetic material.

Preferably, one or more connecting pins may be inserted into one or more connecting grooves and the transport unit may supply power to the operator.

Preferably, the location measurement module may calculate the unwinding length and unwinding angle of the wire based on the rotating amount of the first rotating member and rotation angle of the second rotating member when the wire is unwound.

Preferably, the positioning module may acquire the location information of distal end point of the wire based on the unwinding length and unwinding angle of the wire, indicate and save the location information in a time-ordered sequence in the coordinate system.

Preferably, the wire is electrically conductive, and the positioning module supplies power to the operator through the electrically conductive wire.

Preferably, the transport unit may be induced to move to distal end point of one side of the wire calculated by the positioning module, under the first travelling mode set by the operator.

Preferably, the transport unit may receive user's operation signal, which is input to a controller module through the wire and may control the travel direction, under the second travelling mode set by the operator.

Effect of the Invention

The positioning module of the present invention calculates the unwinding length and unwinding angle of the wire to calculate the location information of some points on the wire, thereby, acquiring accurate location information of the wire which is unwound by the external force exerted by the user.

In addition, the present invention also provides the effect of generating control signals from the action of a user pulling the wire. In the present invention the effect can be realized by calculating the speed based on the location information of the wire and generating the control signals corresponding to the number of times where the speed exceeds the threshold value.

In addition, since the travel control device of the transport unit of the present invention is easy to connect through the magnetic material provided to both the wire and the operator, it is possible to disconnect and remove the operator when traveling control of the transport unit is unnecessary or operator need to be disconnected.

In addition, since external power can be supplied to the operator through a connecting groove formed in the operator, or by connecting a connector to a connecting groove provided in a transport unit, the present invention provides convenience where an operator can be rapidly and easily charged without any cable, when needed.

In addition, the transport module of the present invention has the advantage in that it can supply power, charged in the transport unit, to the operator through the wire, so that it is not affected by the limited battery capacity of the operator when used for a long time.

In addition, in the present invention, the travel mode of the transport unit can be set variously by the user and the transport unit can be guided to travel to the specific point which is calculated by the positioning module. Therefore, the present invention provides convenience that user does not need to perform any operation or control after setting the travel mode.

In addition, according to the present invention, since the traveling direction of the transport unit can be freely controlled based on the operation signal input through the operator by the user, the present invention provides an advantage that it is possible to precisely control the travel direction of the transport unit even in a narrow space which is not accessible for the user.

In addition, according to the present invention, a wire connecting the operator and the transport unit can be automatically wound up or unwound based on the rotational elasticity of the elastic member in the transport unit. Therefore, the present invention provides an advantage of preventing the problem where the wire becomes slack tangling up or entangled with a load or an obstacle.

The present invention also has an advantage of controlling the travel motion of the transport unit based on a control signal for accelerating or decelerating the travel speed of the transport unit after calculating the speed of one distal end point of the wire.

In addition, according to the present invention, since the travel mode of the transport unit can be remotely controlled through the operator, the present invention provides an advantage that the travel mode of the transport unit can be controlled freely without any disruption by obstacles.

In addition, according to the present invention, power is supplied from the positioning module to the operator via the electrically conductive wire. Therefore, the present invention provides an advantage of eliminating the need for a separate power source in the operator and simplifying the structure.

Figure 14:
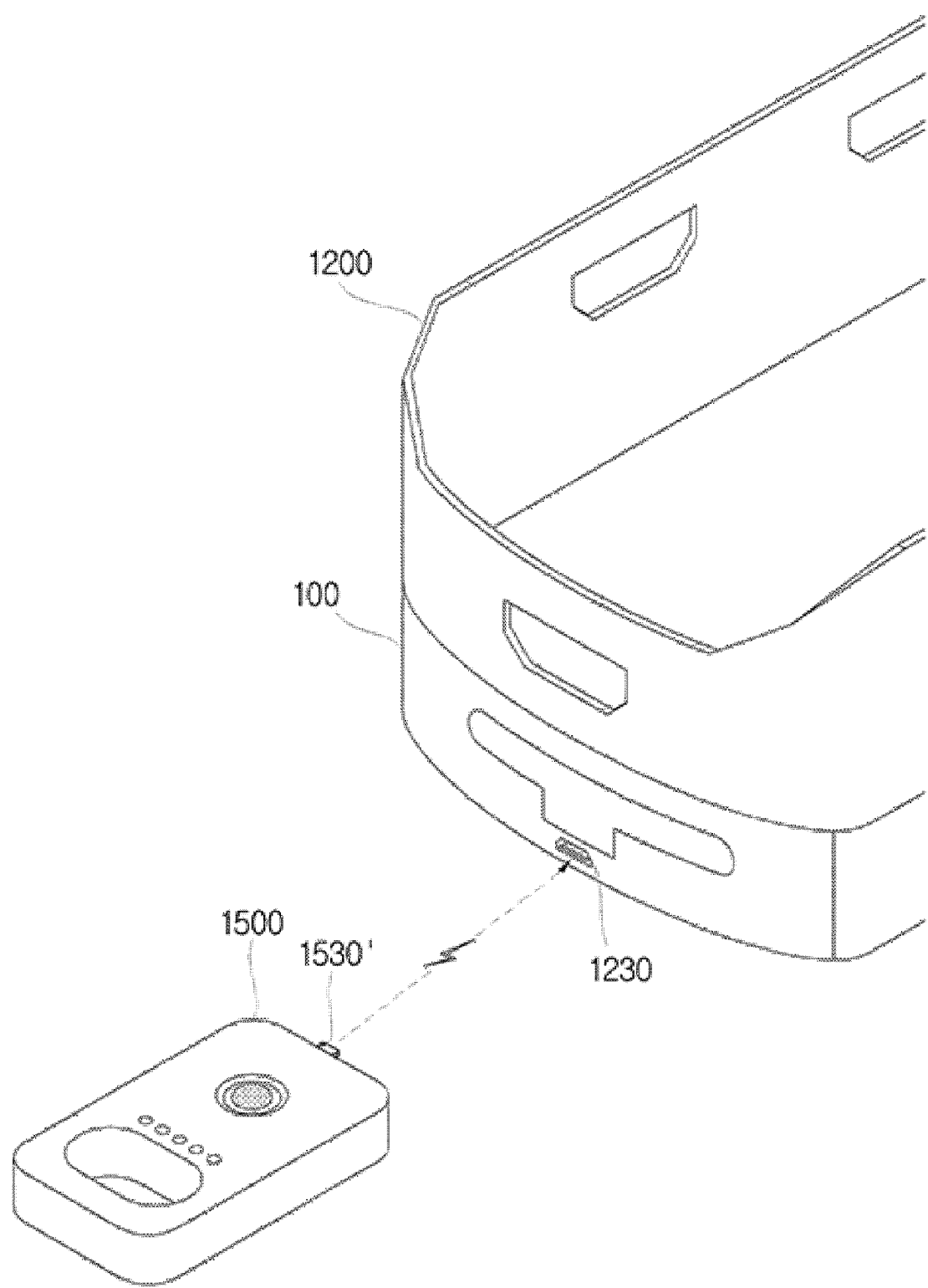

The FIG. 14 schematically shows the image of the connection jack (1530') protruding outward from the operator (1500) and a state in which the connection jack (1530') are inserted into the second connecting groove (1230) of the transport unit (1200) so that the operator (1500) is charged.

Figure 15:
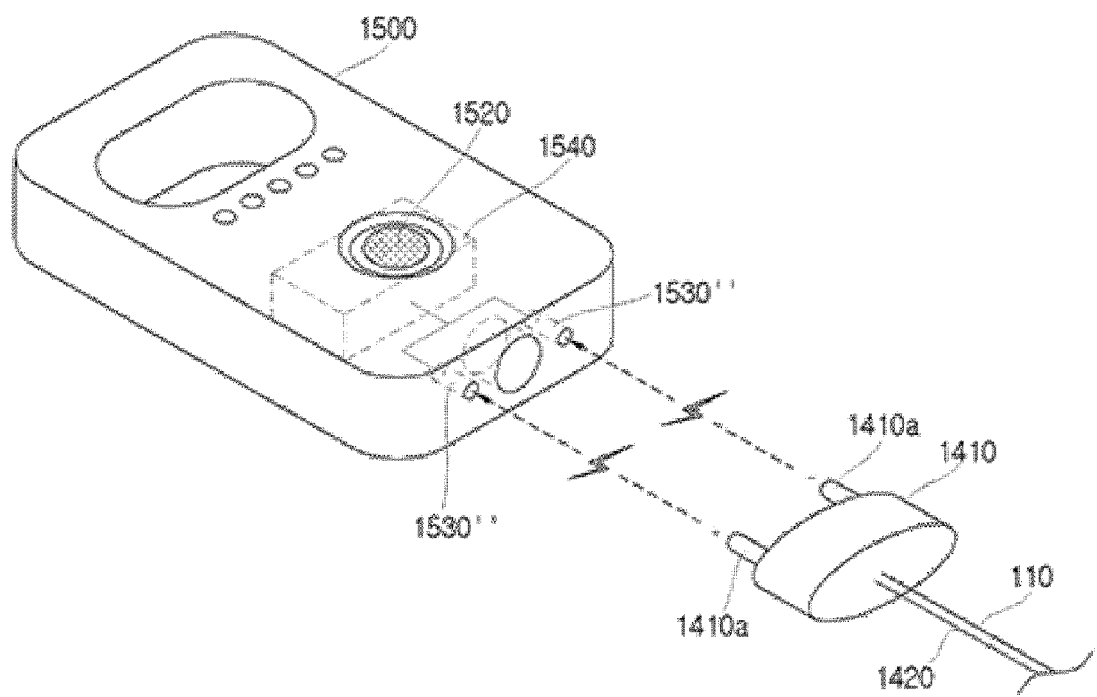

FIG. 15 schematically shows a state in which the shape of the connecting groove (1530") formed in the inward direction from one side of the second magnetic body of the operator (1500) and a state in which the operator (1500) is charged as at least one connecting pin (1410a) protruding from one side of the first magnetic body (1410) is inserted into the connecting groove (1530").

DETAILED DESCRIPTION OF THE INVENTION

<Positioning Module>

Figure 1:
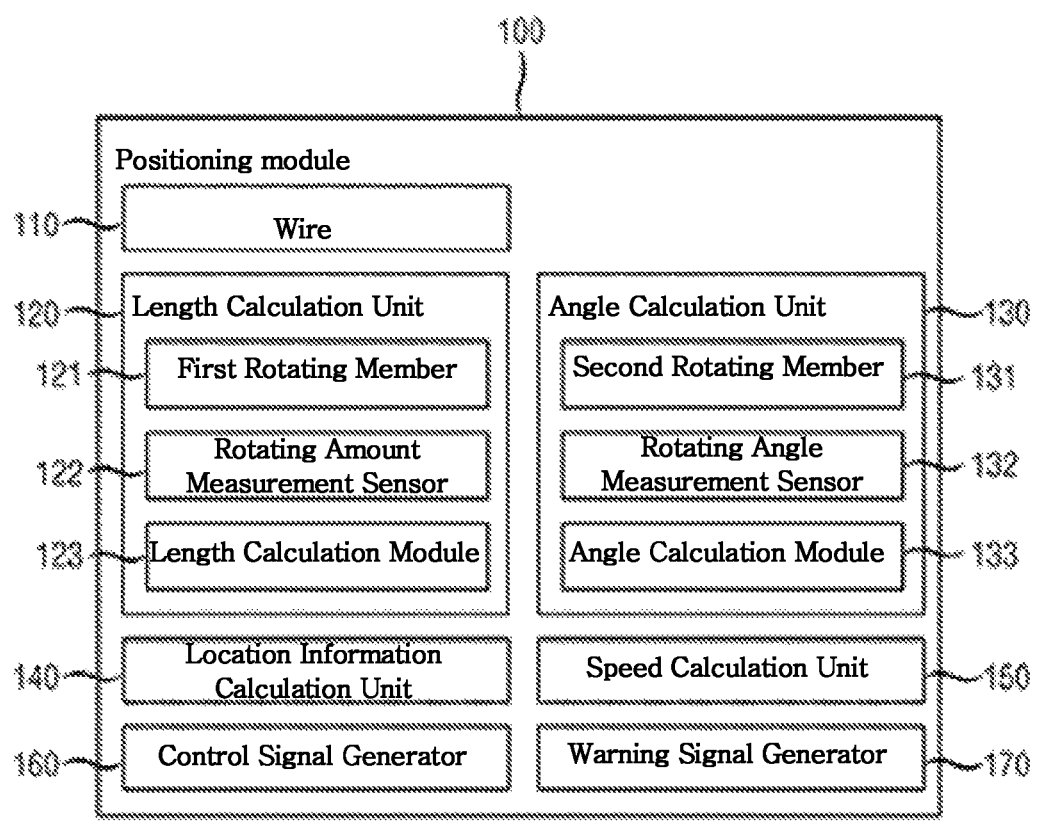
FIG. 1 is a diagram showing a specific configuration of a positioning module according to an embodiment of the present invention.
Figure 2:
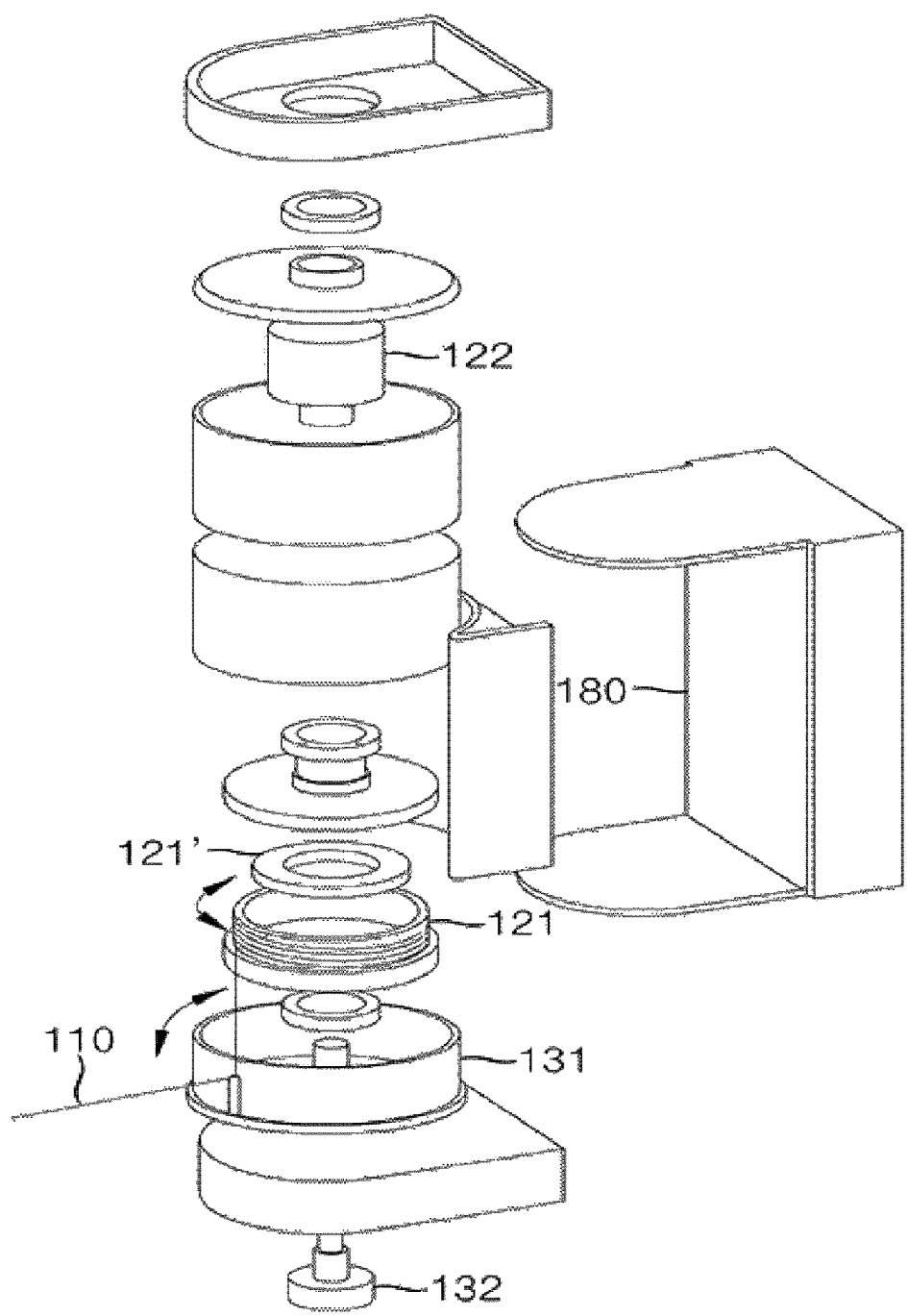
FIG. 2 is an exploded view illustrating the coupling between the configurations of a positioning module according to an embodiment of the present invention.

Referring to FIG. 1 and FIG. 2, the positioning module (100) in an embodiment of the present invention, may comprise a wire (110), a length calculation unit (120), an angle calculation unit (130), a location information calculation unit (130), a speed calculation unit (150), a control signal generator (160), and a warning signal generator unit (170). The specific configuration of the positioning module (100) shown in FIG. 1 is one embodiment, and not all of the blocks shown in FIG. 1 are essential components, and it should to be noted that in other embodiments some blocks may be added, changed or deleted.

Figure 3:
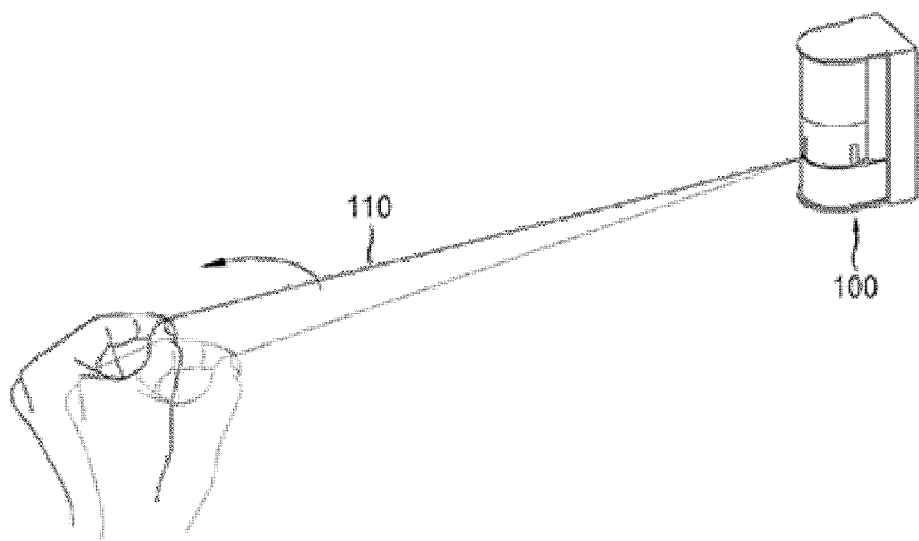
FIG. 3 is a view showing how a wire is unwound from a positioning module according to an embodiment of the present invention.

Referring to FIG. 3, one end of a wire (110) is wound up inside a positioning module (100), as an embodiment of the present invention, and at least a point of the wire (110) can be unwound or wound up by an external force.

It should be noted that when the wire (110) is unwound or wound up inside the positioning module (100), the wire (110) are not limited to certain materials or types, as long as they are not broken by the applied tension.

The length calculation unit (120) can calculate the length of the unwound wire (110). More specifically, the length calculation unit (120) may be pulled by an external force exerted by a user to calculate the length of the wire (110) unwound from the positioning module (100). To this end, the length calculation unit (120) may comprise a first rotating member (121), a rotation amount measurement sensor (122), and a length calculation module (123).

The first rotating member (121) is formed in a cylindrical shape and connected to one end of the wire (110), and the wire (110) can be unwound or wound up outside the first rotating member (121). The wire (110) may be unwound from the first rotating member (121) when the first rotating member (121) rotates in either a clockwise or counterclockwise direction, and the wire (110) may be wound up in the other direction.

An elastic member (121'), which rotates on the same axis of rotation with the first rotating member (121) and has rotational elasticity, may be connected to the inner side of the first rotating member (121). The elastic member (121') may be a spring. Thereby, when the wire (110) is unwound by an external force on the first rotating member (121) and the first rotating member (121) rotates, the rotational elasticity of the elastic member (121') may increase in proportion to the rotating amount of the first rotating member (121) which rotates due to the wire (110) being unwound.

In other word, as the wire (110) is unwound from the first rotating member (121), the rotational elasticity of the elastic member (121') increases, requiring greater external force to pull the wire (110) so that the wire (110) can be unwound from the first rotating member (121).

In addition, when an external force is not applied to the wire (110) or an external force is smaller than the rotational elastic force, the first rotating member (121) rotates in the opposite direction to the unwinding direction due to the rotational elasticity of the elastic member (121'), so that the wire (110) can be wound up on the first rotating member (121).

The rotation amount measurement sensor (122) may measure the rotation amount of the first rotating member (121). More specifically, the rotation amount measurement sensor (122) may be connected to the first rotating member (121) to measure the rotation amount of the first rotating member (121) due to the wire (110) being unwound.

When the wire (110) is fully wound up to the first rotating member (121), the rotation amount measurement sensor (122) can measure the rotation amount based on the position of the first rotating member (121). For example, if the wire (110) is fully wound up to the first rotating member (121), the rotation amount of the first rotating member (121) measured by the rotation amount measurement sensor (122) may be zero.

The rotation amount measurement sensor (122) may be an encoder that measures the rotation amount by counting the number of grooves passed by the rotary encoder ring with grooves formed at equal intervals rotating along with the first rotating member (121).

Briefly, a number of holes or grooves (hereinafter referred to as "graduations") are formed on the rotary encoder ring (110) at equal intervals. When the rotary encoder ring rotates, the readout head counts how many graduations formed on the rotary encoder ring have been passed. The spacing of the graduations, or the number of graduations in one revolution, is preset in the manufacture of the rotary encoder ring, so that the number of graduations counted in the readout head can be used to determine how much the rotary encoder ring has rotated.

In addition, the rotation amount measurement sensor (122) may be a potentiometer that outputs a voltage proportional to the rotation amount by moving the wiper over the resistor when the axis of rotation rotates according to the change of the rotational displacement.

The length calculation module (123) can calculate the unwinding length of the wire (110) in proportion to the rotation amount of the first rotating member (121) measured by the rotation amount measurement sensor (122). More specifically, the length calculation module (123) can calculate the unwinding length (l) by multiplying the circumference length ($l_1$) of the first rotating member (121) by the rotation amount ($r_1$) of the first rotating member (121). At this time, the length calculation module (123) can calculate the unwinding length by applying the following Equation (1).

$$l = a l_1 \times r \qquad \text{[Equation 1]}$$

In the above equation, "l" can be the unwinding length of the wire, "$l_1$" can be the circumference length of the first rotating member, "a" can be the circumference length correction constant, and "$r_1$" can be the rotation amount of the first rotating member.

The angle calculation unit (130) may calculate the unwound angle of the wire (110). More specifically, the angle calculation unit (130) can calculate the angle between the wire (110), drawn by the external force exerted by a user, and the positioning module (100). For this purpose, the angle calculation unit (130) may comprise the second rotation member (131), a rotation angle measuring sensor (132) and an angle calculation module (123).

The second rotation member (131) is formed in a cylindrical shape and a groove (131') through which the wire (110) can pass from the inside to the outside of the second rotation member (131) may be formed. That is, one end of the wire (110) is connected to the first rotating member (121), and the other end of the wire (110) may be unwound outward from the positioning module (100) through the groove (131') formed in the second rotation member (131).

The second rotation member (131) is located on some points of the wire (110) located inside of the second rotation member (131) and on the outside of the positioning module (100), when the unwinding angle of the wire (110) due to an external force is changed. The groove (131') of the second rotation member (131) can rotate by receiving an external force from the wire (110) in order to form a straight line between the points upon receiving external force. At this time, the axis of rotation of the first and second rotation members (131) may be the same.

The rotation angle measuring sensor (132) may measure the rotation angle of the second rotation member (131). More specifically, the rotation angle measuring sensor (132) may be connected to the second rotation member (131) to measure the rotation angle of the second rotation member (131) caused by the change in the unwinding angle of the wire (110).

Here, the rotation angle measuring sensor (132) can measure the rotation angle based on the position where the second rotation member (131) rotates either in a clockwise or counterclockwise direction based on the above-described axis of rotation to the maximum extent.

The rotation angle measuring sensor (132) may be an encoder that measures a rotation amount by counting the number of grooves passed by the rotary encoder ring with grooves formed at equal intervals rotating together with the second rotation member (131). In addition, the rotation angle measuring sensor (132) may be a potentiometer that outputs a voltage proportional to the rotation angle by moving the wiper over the resistor when the axis of rotation rotates according to the change of the rotational displacement.

The angle calculation module (133) may calculate the unwinding angle of the wire (110) using the rotation angle of the second rotation member (131) measured by the rotation angle measuring sensor (132). More specifically, the angle calculation module (133) may calculate the unwinding angle (r) by multiplying the rotation angle ($r_2$) of the second rotation member (131) by the rotation angle correction constant (b).

In the above description, the rotation angle correction constant (b) may be a correction constant for correcting the rotation angle ($r_2$) to the unwinding angle (r) depending on the type of the rotation angle data measured by the rotation angle measuring sensor (132). For example, if the rotation angle measuring sensor (132) is a potentiometer that outputs a voltage according to the change of the rotation angle of the second rotation member (131), the angle calculation module (133) may calculate the unwinding angle (r) using a rotation angle correction constant (b) that corrects the output voltage data to the unwinding angle (r). Here, the angle calculation module (133) can calculate the unwinding angle applying the following Equation (2).

$$r=br_2 \qquad \text{[Equation 2]}$$

Here, "r" is the unwinding angle of the wire, "$r_2$" is the rotation angle of the second rotation member, and "b" is the rotation angle correction constant.

The location information calculation unit (140) calculates the location information of at least a point on the wire (110) using the unwinding length and unwinding angle calculated by the length calculation unit (120) and save the information in a time-ordered sequence in the coordinate system. Here, at least a point on the wire (110) may be the end (A) of the wire (110). In addition, the coordinate system may be either an x-y orthogonal coordinate system, a three-dimensional coordinate system, or a cylindrical coordinate system.

The location information calculation unit (140) may include one or more among a flash memory, an SRAM (Static Random Access Memory), an EEPROM (Electrically Erasable and Programmable Read Only Memory), an EPROM (Erasable and Programmable Read Only Memory), a hard disk drive (HDD), and a solid state drive (SSD) in order to save the coordinates calculated.

Figure 4:
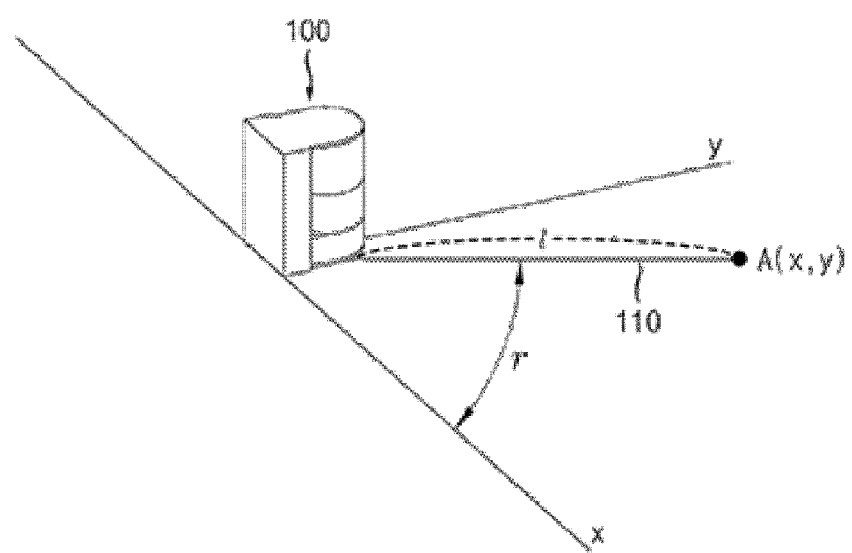
FIG. 4 is a diagram for explaining a location information calculating process of the positioning module according to an embodiment of the present invention.

Referring to FIG. 4, the location information calculation unit (140) may calculate the location information of the end (A) of at least a point on the wire (110) unwound by an external force on the x-y orthogonal coordinate system for each reference time T ($\Delta T$). Here, the reference time T ($\Delta T$) may be a period in which the location information calculation unit (140) calculates the coordinates of the location information. For example, the reference time T ($\Delta T$) may be 20 ms.

The length calculation unit (120) and the angle calculation unit (130) may also calculate an unwinding length and an unwinding angle for each reference time T($\Delta T$) in order for the location information calculation unit (140) to calculate location information for each reference time T($\Delta T$). For example, the location information calculation unit (140) may calculate the location information of the distal end (A) of the wire as x-coordinates and y-coordinates on the x-y orthogonal coordinate system using the unwinding length (l) calculated by the length calculation unit (120) and the unwinding angle (r) calculated by the angle calculation unit (130). More specifically, the location information calculation unit (140) may calculate the x-coordinate using Equation (3) and calculate the y-coordinate using Equation (4).

$$x=l\times\cos r \qquad \text{[Equation 3]}$$

Here, "x" is the x-coordinates on the x-y orthogonal coordinate system of the wire end, "l" is the unwinding length of the wire, and "r" is the unwinding angle of the wire.

$$y=l\times\sin r \qquad \text{[Equation 4]}$$

Here, "y" is the y-coordinates on the x-y orthogonal coordinate system at the wire end, "l" can be the unwinding length of the wire, and "r" can be the unwinding angle of the wire.

Figure 5:
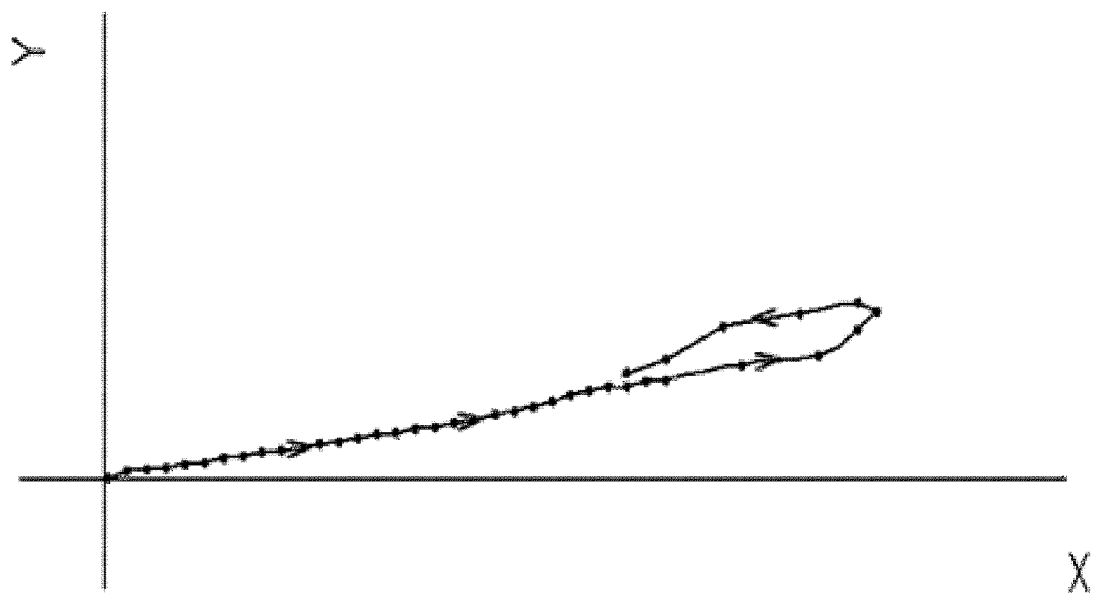
FIG. 5 and FIG. 6 are graphs of coordinates indicated on the x-y orthogonal coordinate system showing the location information calculated by the location measurement module according to an embodiment of the present invention.

Referring to FIG. 5, after the wire (110) is unwound by an external force in a state where it is wound up to the maximum extent on the first rotating member (121), when the wire (110) is wound up again on the first rotating member (121) as the rotational elasticity applied on the first rotating member (121) from the elastic member (121') is greater than the external force exerted on the wire (110), as shown in FIG. 4, the location information of at least a point of the wire (110) can be calculated as a plurality of coordinates for each reference time T ($\Delta T$).

Figure 6:
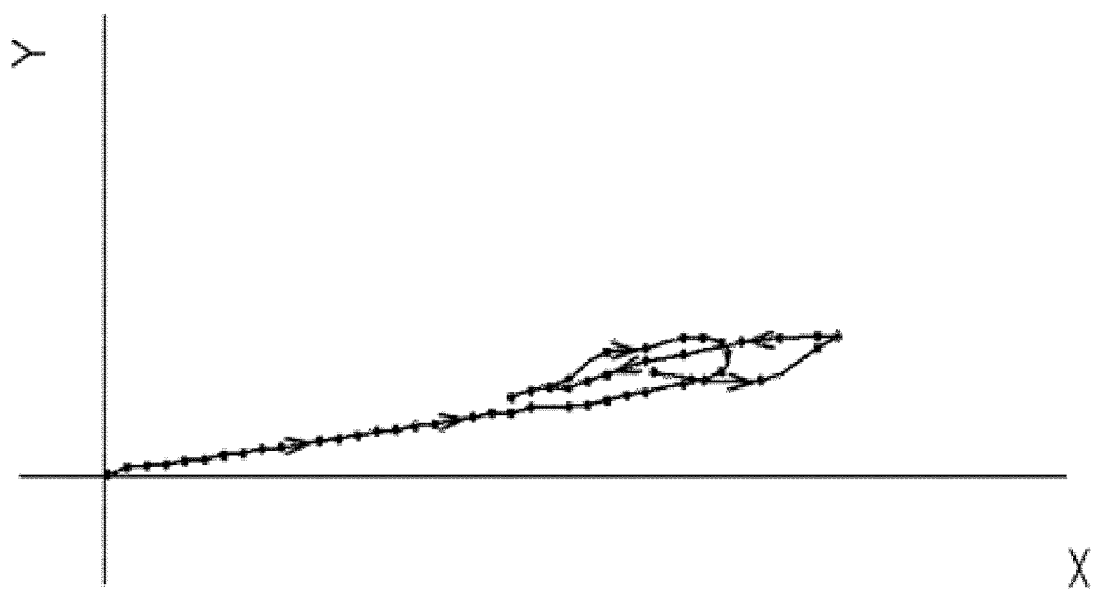

Referring to FIG. 6, when the unwinding and winding up of the wire (110) are repeated twice, as shown in FIG. 5, the location information calculation unit (140) calculates the location information of at least a point on the wire (110) as multiple coordinates for each reference time ($\Delta T$).

The speed calculation unit (150) may calculate the moving distance ($\Delta L$) at which at least a point of the wire (110) has moved during the reference time ($\Delta T$) as the speed value (V). More specifically, the speed calculation unit (150) calculates a moving distance ($\Delta L$) in which the wire (110) moves during the reference time ($\Delta T$) from the coordinates before and after the reference time ($\Delta T$) respectively, and a moving distance ($\Delta L$) is divided by the reference time ($\Delta T$) to calculate the speed value (V).

Figure 7:
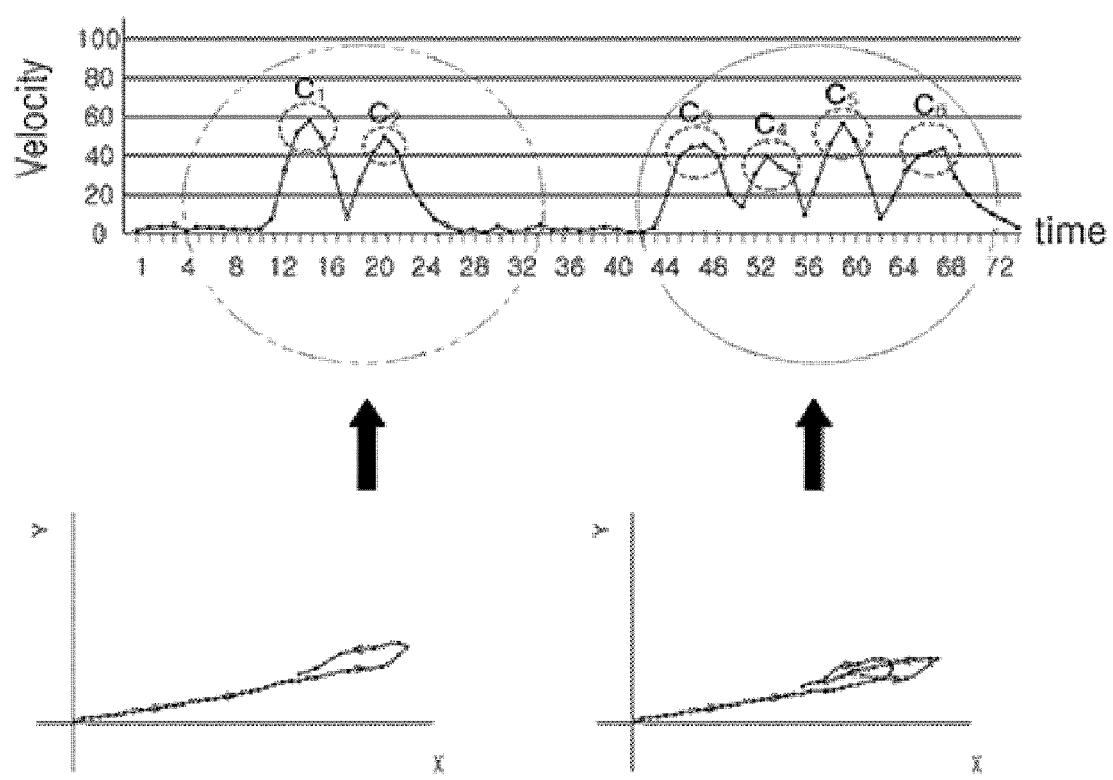
FIG. 7 is a graph showing the speed value of at least a point on the wire, calculated by a positioning module, according to an embodiment of the present invention.

Referring to FIG. 7, the speed calculation unit (150) receives location information (coordinates) of at least a point of the wire (110) shown in FIG. 5 and FIG. 6 from the location information calculation unit (140) to calculate the speed value (V) by dividing the moving distance ($\Delta L$) by the reference time ($\Delta T$).

The speed value (V) calculated from the speed calculation unit (150) is determined such that, when the wire (110) is unwound and wound up in the first rotating member (121) by an external force, the speed value (V) increases from the time when the wire (110) starts to be unwound to the time point when the wire (110) is stopped, and then decreases. The speed value (V) again increases from the time when the wire (110) starts to be wound up to the time point when the wire (110) is stopped, and then decreases. That is, when the wire (110) is unwound or wound up on the first rotating member (121), the speed value (V) of the at least a point on the wire (110) may increase and then decrease once. At this time, a control signal generator (160) may generate a control signal by comparing the speed value (V) calculated by the speed calculation unit (150) with the preset threshold value.

Here, the preset threshold value may be a reference value for determining whether an external force applied from the outside is a control signal input. That is, when the speed value (V) exceeds the preset threshold value, the control signal generator (160) can determine that the control signal is input from the user through the wire (110).

More specifically, as the repeated increase and decrease of the speed value (V) of at least a point on the wire (110) calculated from the speed calculation unit (150) creates curves, a control signal generator (160) can generate control signals corresponding to the number of curves where the speed value exceeds the threshold value within the preset time. Here, the control signal may either accelerate, decelerate or stop the traveling device.

Referring to FIG. 7, when a preset threshold value is 20, a control signal generator (160) may determine whether the speed value of the curve (C1), initially formed by repeated increase and decrease in the speed value (V), exceeds the threshold value of 20. A control signal generator (160) can determine whether a curve of speed value exceeding the threshold value within a preset time is formed, as a result of determining that the speed value of the curve (C1) exceeds the threshold value. A control signal generator (160) may determine that the curve (C2) is formed within the preset time and the speed value exceeds the threshold value. At this time, a control signal generator (160) can generate an control signal that accelerates the traveling speed of the traveling device by determining two curves (C1, C2) exceeding the threshold value within the preset time. Then, a control signal generator (160) can determine that the curves (C3, . . . , C6) are formed within the preset time and the speed value of the curves (C3, . . . , C6) exceed the threshold value, thus, generate a control signal that decelerates the traveling speed of the traveling device by determining four curves (C3, . . . , C6) exceeding the threshold value within the preset time. According to an embodiment of the present invention, when the position measuring apparatus (100), connected to traveling device, transmits a control signal, generated from a control signal generator (160), the traveling device can be controlled in response to the control signal.

The warning signal generator unit (170) can generate a warning signal if the unwinding length of the wire (110) calculated from the length calculation unit (120) exceeds the preset length, in order to prevent the wire (110) from being unwound beyond the length of the limited wire (110). Here, the preset length may be 30 cm to 2 m.

The warning signal generator unit (170) may include a warning signal output unit for outputting a warning signal to warn the user. The warning signal output unit can be either a display device that outputs a warning signal in more than one of the forms including characters, symbols, pictures, and numbers, or a speaker that outputs a warning signal with sound.

The PCB housing (180) comprises and houses a length calculation module (123), an angle calculation module (133), a location information calculation unit (140), a speed calculation unit (150), a control signal generator (160), all mounted on a printed circuit board (PCB).

A length calculation module (123), an angle calculation module (133), a location information calculation unit (140), a speed calculation unit (150), a control signal generator (160) and a warning signal generator unit (170) can be a form of microcontroller unit (MCU) that drives software such as applications through a central processing unit (CPU).

Figure 8:
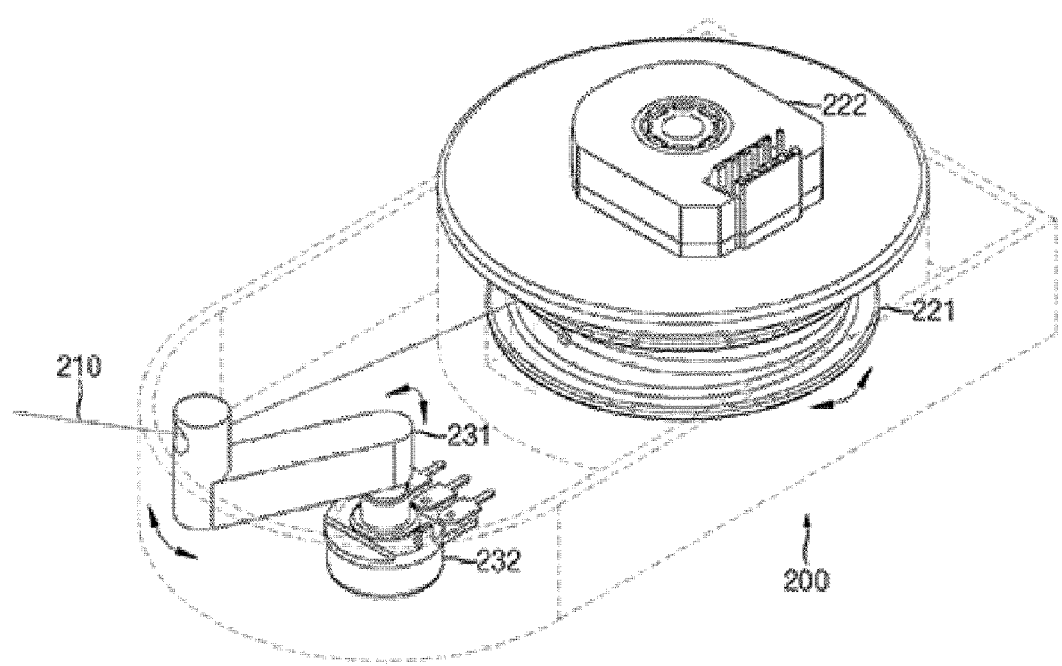
FIG. 8 specifically shows a length calculation unit and an angle calculation unit of a positioning module in another embodiment of the present invention.

FIG. 8 schematically shows a length calculation unit and an angle calculation unit of the positioning module (200) according to another embodiment of the present invention. Comparing the positioning module (100) of one embodiment of the present invention shown in FIG. 1 and FIG. 2 and the positioning module (200) of another embodiment of the present invention shown in FIG. 8, only the structure of the angle calculation unit is different while the rest of the structure and their respective roles are the same, so a detailed description will be omitted.

Referring to FIG. 8, according to another embodiment of the present invention, the axis of rotation of the first rotating member (221) and the rotation measuring sensor (222) of the positioning module (200) may be different from the axis of rotation of the second rotation member (231) and the rotation angle measuring sensor (232).

In addition, the second rotation member (231) is located at the front of the first rotating member (221) and formed in a shape bent at 90 degrees, with a groove on one side through which the wire (210) can pass.

The wire (210) passing through the groove formed in the second rotation member (231) may exert a repulsive force on the second rotation member (231) to maintain a straight line from the first rotating member (221) as the unwinding angle is changed, which in turn makes the second rotation member (231) rotate with the unwinding angle of the wire (210).

At this time, the other side of the second rotation member (231) may be connected to the rotation angle measuring sensor (232) and rotate, so that the rotation angle measuring sensor (232) can measure the rotating angle.

Figure 9:
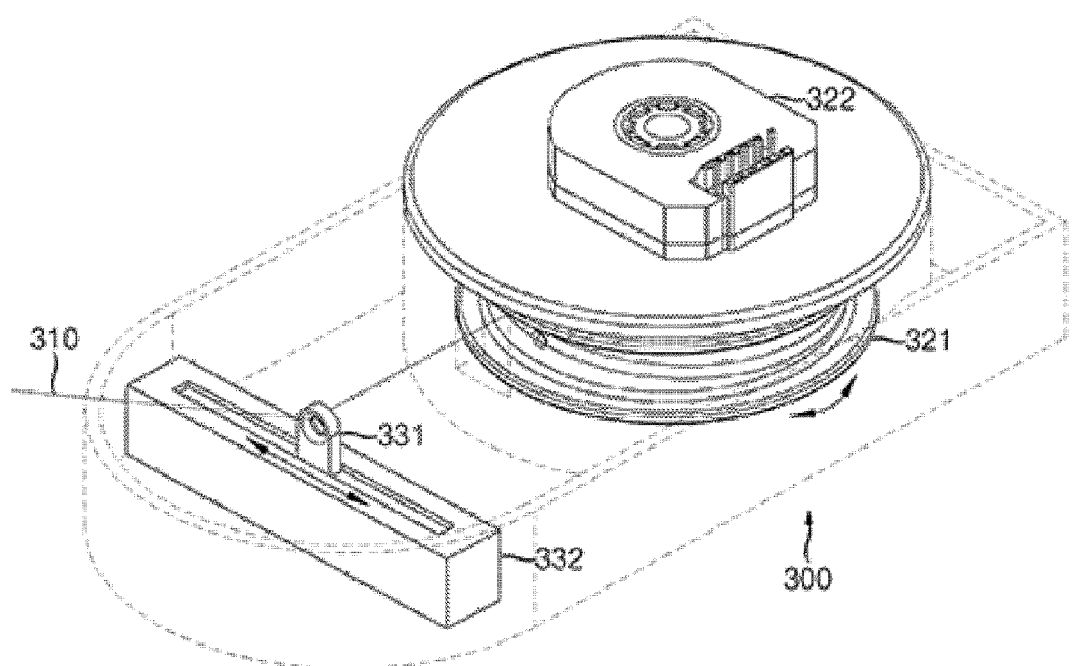
FIG. 9 specifically shows a length calculation unit and an angle calculation unit of a positioning module in yet another embodiment of the present invention.

FIG. 9 specifically shows a length calculation unit and an angle calculation unit of the positioning module (100) in another embodiment of the present invention. Comparing the positioning module (100) in one embodiment of the present invention shown in FIG. 1 and FIG. 2 and the positioning module (100) in another embodiment of the present invention shown in FIG. 9, a positioning module (100) in another embodiment of the present invention have the second rotation member (131) and the rotation amount measurement sensor (132) of the positioning module (100) replaced by the present invention the member (331) and the distance measuring sensor (332) respectively, while the rest of the structure and their respective roles are the same, so a detailed description will be omitted.

Referring to FIG. 9, the traveling member (331) and the distance measuring sensor (232) of the positioning module (100) in another embodiment of the present invention may be located at the front of the first rotating member (321) and rotation amount measurement sensor (322). The traveling member (331) is movable in a straight line, and a groove through which the wire (310) passes can be formed.

The wire (310) unwound from the first rotating member (321) passes through the groove formed in the traveling member (331). The wire (310) can exert a repulsive force to the traveling member (331) in order to maintain a straight line from the first rotating member (321) as the unwinding angle changes. As a result, the traveling member (331) can move linearly by the unwinding angle of the wire (210). At this time, the other side of the traveling member (331) is connected to the distance measuring sensor (332) to move in a straight line, and the distance measuring sensor (332) can measure the moving distance of the traveling member (331). Hereafter, the angle calculation unit of the positioning module (100) in another embodiment of the present invention can calculate the unwinding angle of the wire (310) based on the moving distance of the traveling member (331) measured by the distance measuring sensor (332).

<A Travel Control Device in the Transport Unit>

Figure 10:
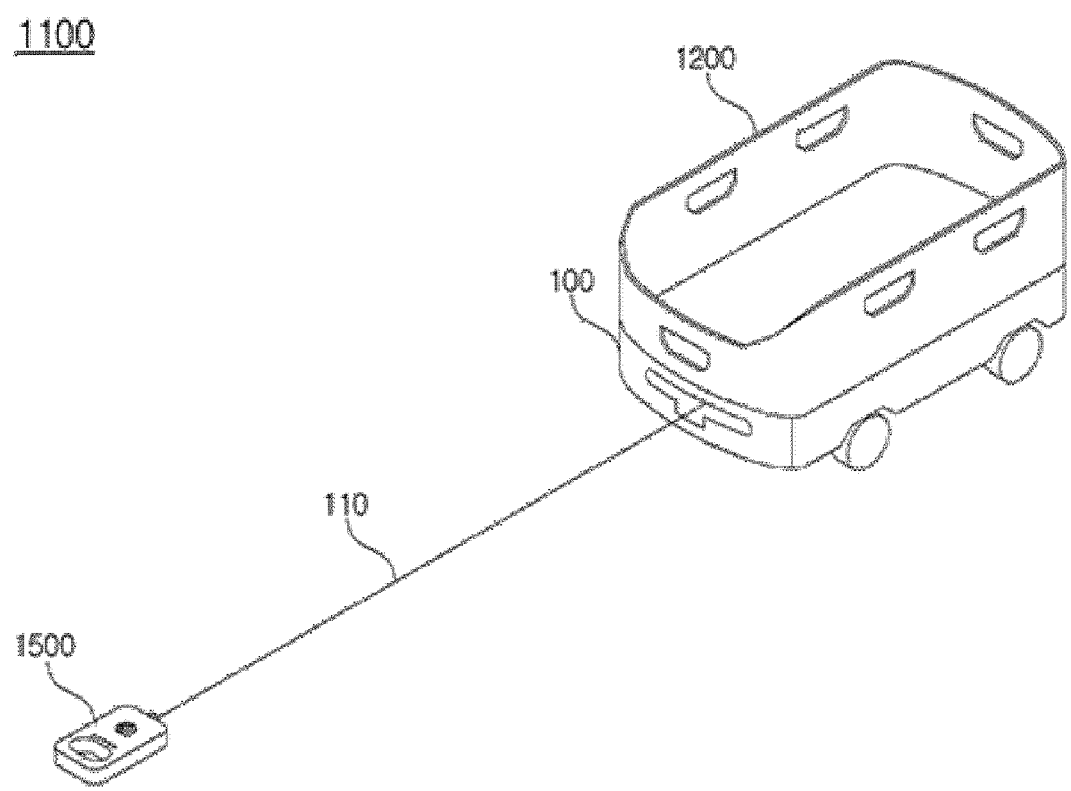
FIG. 10 is a view schematically showing the image of a travel control device (1100) of a transport unit according to an embodiment of the present invention.

Referring to FIG. 10, a travel control device (1100) may comprise a transport unit (1200), a positioning module (100), a wire (110) and an operator (1500).

First, the transport unit (1200) may refer to a transport means for moving, transporting, and delivering various goods or various industrial materials, and may comprise a housing corresponding to an internal space or a loading space, and one or more wheels for moving the transport unit (1200) on the floor may be provided on the lower side of the housing.

Here, the transport unit (1200) may further include a driving unit for transmitting power (rotational force) to one or more wheels and the second battery for supplying power to the driving unit. For example, the driving unit may refer to a motor, and the second battery may refer to a battery supplying electrical energy to the motor.

In the above description, the motor is preferably interpreted to include all of the physical and electrical devices capable of rotating one or more of the wheels. Particularly, the battery is preferably interpreted to be a secondary battery, capable of charge and discharge, such as a lithium ion battery, a lithium polymer battery, a nickel cadmium battery, Nickel-hydrogen battery, nickel-zinc battery, and the like, and it should be noted that a primary battery, which is not rechargeable unlike a secondary battery, can also be applied.

In addition, the second battery may have a rated capacity and a rated output capacity sufficient to sustain the operation (or rotation) of the driving unit described above. In particular, the second battery may also work as an inverter or a converter that converts the output voltage in proportion to the amount of power required by the operator (1500) by also playing a role of recharging the first battery installed within the operator (1500) mentioned below.

The positioning module (100) may be located in at least a part of the transport unit (1200) described above. For example, the positioning module (100) may be located on the inside of the transport unit (1200), or at the lower side of the transport unit (1200) in a way it can be seen from the outside, and it should be noted that this particular specification describes and shows the positioning module (100) to be located at the lower side of the transport unit (1200) in a way it can be seen from the outside. It should be noted that the location of the positioning module (100) is not limited to be this way although it is specifically shown to be exposed to the outside from the lower part of the transport unit (1200). In addition, it should be also noted that the positioning module (100) may be configured to be attached to and detached from the transport unit (1200), and can be used and operated independently of the transport unit (1200).

The positioning module (100) may take the form of a reel (electric extension) module in which a wire (110) is wound up inside. The positioning module (100) calculates the unwinding length and unwinding angle of the wire (110), which is unwound by an external force, and calculate the location information and the speed value of a specific point on the wire (110) (for example, the first magnetic material (1410) which will be described below) over time, using the calculated unwinding length and unwinding angle. Since positioning module (100) and the wire (110) are described in detail, redundant explanation will be omitted.

In one embodiment of the present invention, the wire (110) may have electrical conductivity. In this case, the operator (1500) and the transport unit (1200) can be electrically and communicatively connected to each other by the electrical conductivity wire (110).

In short, the operator (1500) can be driven by the power supplied from the energy source of the positioning module (100) via the electrical conductivity wire (110). The signal generated by the operation of the operator (1500) is transmitted to the transport unit (1200) through the electrical conductivity wire (110), so that the operator (1500) can control the traveling of the transport unit (1200).

Figure 11:
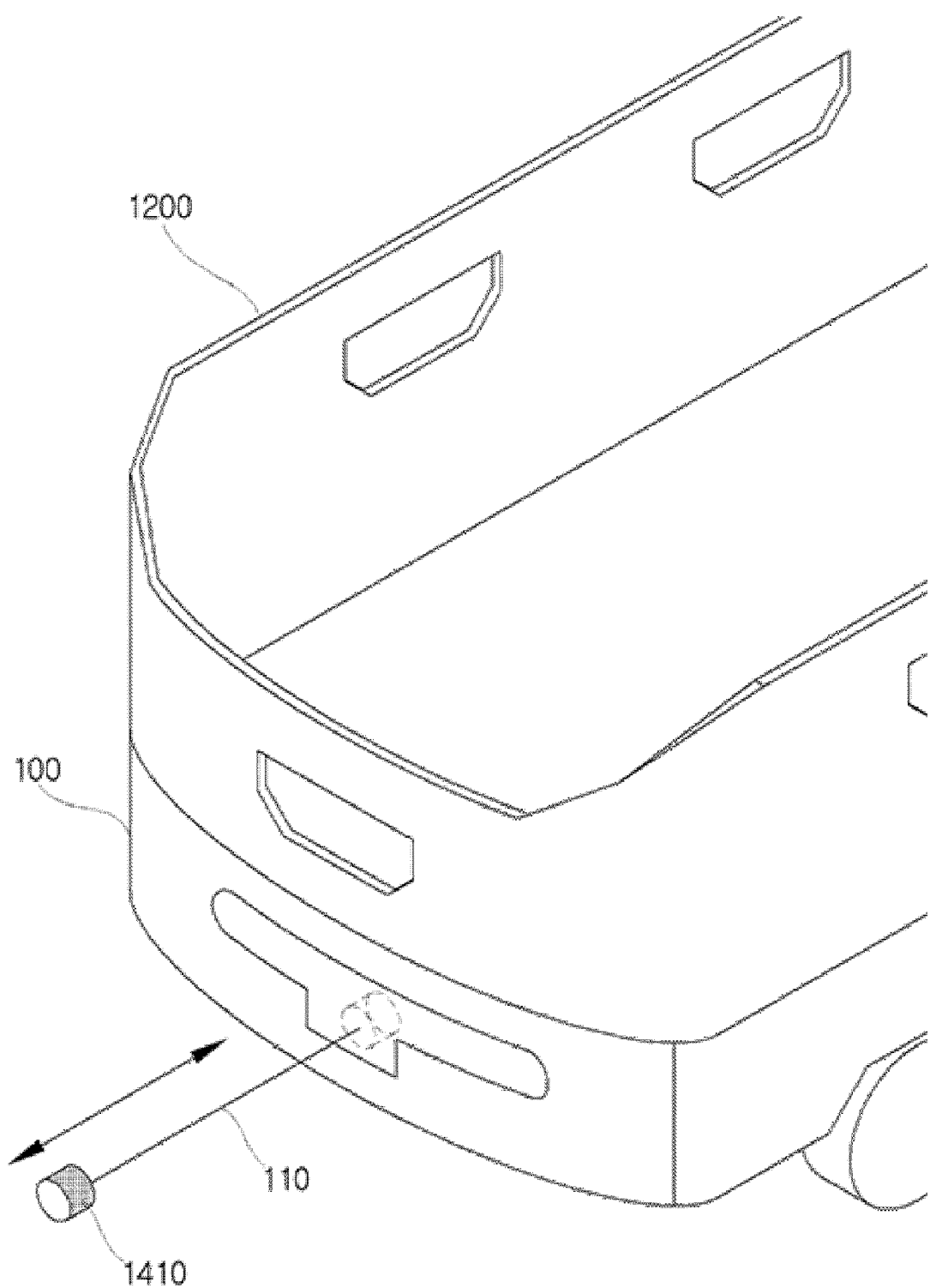
FIG. 11 is a view schematically showing a state where the wire (110) is unwound or wound up from the positioning module (100) located at the lower side of the transport unit (1200).

Referring to FIG. 11, the first magnetic material (1410) (e.g., a magnet, etc.) having a magnetic force to be detachable from the operator (1500), may be provided at the distal end of the wire (110).

Similarly, the first magnetic material (1410), described above, and the second magnetic material (1510), detachable from the first magnetic material (1410) using a magnetic force, may be provided on one side of the operator (1500), which will be described later. Here, the first and the second magnetic materials (1410) and (1510) are configured to have different polarities, creating attracting forces between each other.

The operator (1500) can be gripped by the user's hand while being detached from the wire (110) unwound from the positioning module (100). If the user holding the operator (1500) moves, position of the first magnetic material (1410) located at the distal end of the wire (110) is shifted, thereby generating a shift in location. Thereafter, the transport unit (1200) may travel in a direction toward the operator (1500), in accordance with the change in the position of the operator (1500) as described above.

In addition, even in a state where the operator (1500) is not connected with the wire (110) (e.g., the wire (110) is wound up inside the positioning module (100) and not connected to the operator (1500)), the operator (1500) can wirelessly transmit a control signal to the transport unit (1200). To this end, the transport unit (1200) may comprise a signal receiving unit (not shown) for receiving the wireless control signal.

Figure 12:
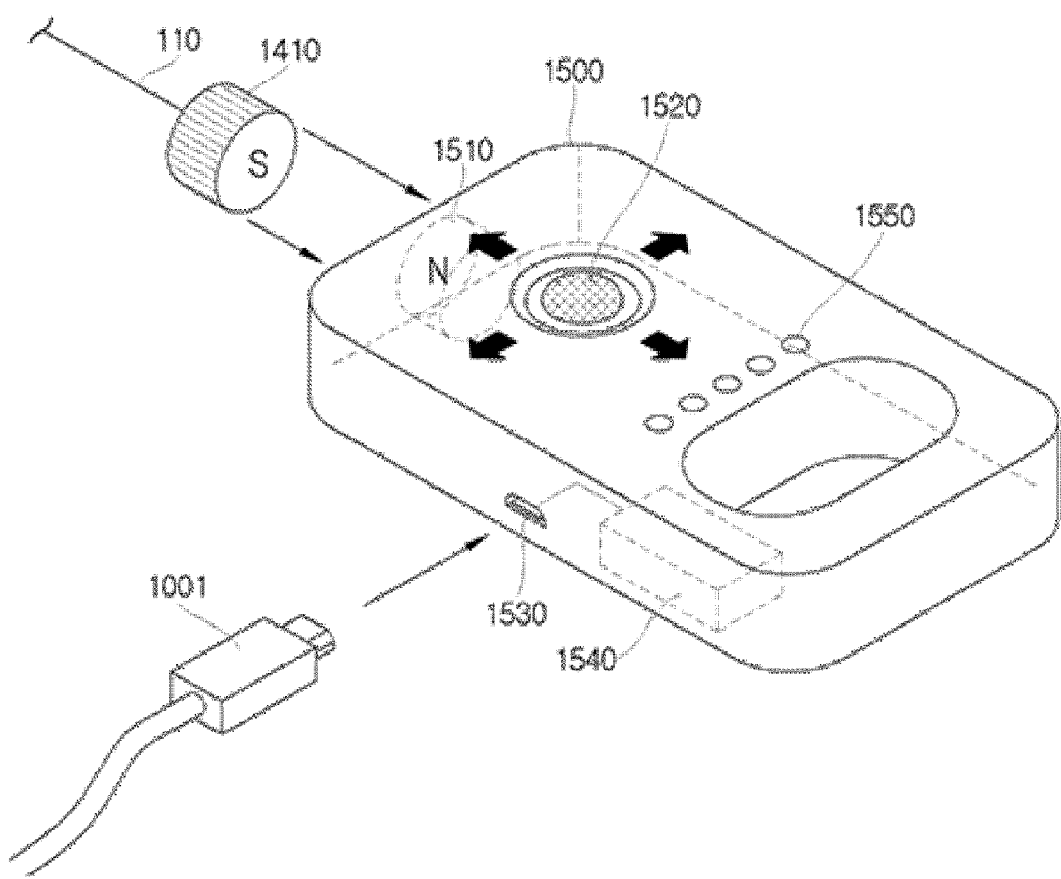
FIG. 12 is a diagram showing the image of the operator (1500) more specifically.
Figure 13:
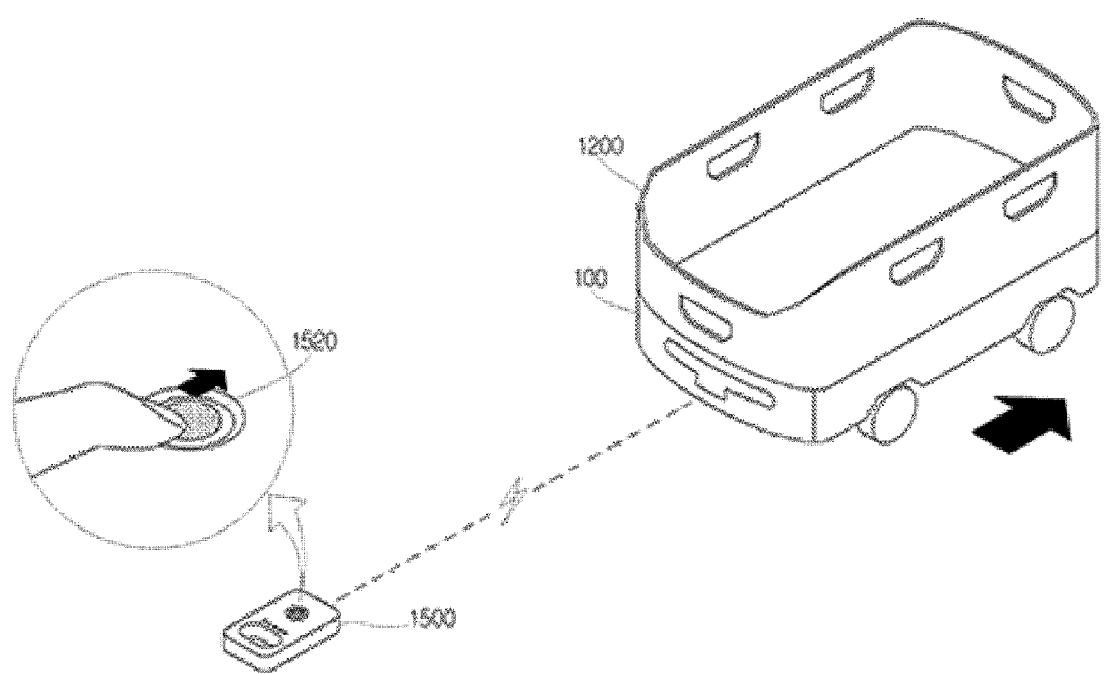
FIG. 13 schematically shows a state of wirelessly controlling the travel motion of the transport unit (1200) by operating the controller module (1520) in up, down, left, and right direction.

Referring to FIG. 12 and FIG. 13, the operator (1500) comprises the second magnetic material (1510), the controller module (1520), the first connecting groove (1530), the first battery (1540) and the status display module (1550), and may further include a mode change switch (not shown) which is a toggle switch for changing the traveling mode of the transport unit (1200) in one embodiment.

The second magnetic material (1510) is detachable from the magnetic material (1410) described above by the magnetic force. In addition, the second magnetic material (1510) may be a magnetic material having a polarity different from that of the first magnetic material (1410). When the first and second magnetic materials (1410) and (1510) are attached to and detached from each other by a magnetic force, traveling motion and traveling direction of the transport unit (1200) can be changed corresponding to the changing location of the first magnetic material (1410).

In an embodiment of the present invention, the operator (1500) may be provided with a metal plate (not shown) rather than the second magnetic material (1510). The metal plate may be provided at the same location as the second magnetic material (1510) on one side of the operator (1500) so as to replace the role of the second magnetic material (1510). For example, as the metal plate may be detachable from the outside of the operator (1500), it may be attached to and detached from the first magnetic material (1410) by the magnetic force of the first magnetic material (1410) described above. In another example, the metal plate may be inserted or interposed in the inside of the operator (1500), so that the first magnetic material (1410) may be attached to and detached from the first magnetic material (1410) through the magnetic force of the first magnetic material (1410).

Meanwhile, it should be noted that as long as the metal plate performs the above-described role (bringing the first magnetic material (1410) and the operator (1500) into contact at one side, so as to they are detached from each other through the magnetic force of the first magnetic material (1410)), the material and type, thickness, area, etc. of the metal plate are not limited.

The controller module (1520) may be embodied as a control lever-typed input device, such as a joystick, and may rotate around the axis at a rotational radius of 360 degrees by the finger manipulation of the user.

In one embodiment, as the user manipulates the controller module (1520) provided in the operator (1500), a control signal is transmitted from the operator (1500) to the signal receiving unit (not shown) of the transport unit (1200) wirelessly. In this case, the driving unit of the transport unit (1200) can control the rotational speed, the rotational direction, and the like based on the control signal applied through the wireless communication.

The first connector groove (1530) may be located on one side (e.g., a side or bottom side) of the operator (1500) and may mean a groove which can be powered by the outside power supply jack (1001). The first connector groove (1530) may be electrically connected to the first battery (1540) to charge and store the supplied power. Also, the operator (1500) can operate with the power charged in the first battery (1540) as an energy source. It should be noted that, while the first connecting groove (1530) is shown to be grooved inside corresponding to the shape of the power supply jack (1001) so as to accommodate an external power supply jack (1001), it can take various forms including the form of a connecting jack protruding outward so as to be inserted into the connecting groove formed in the transport unit (1200) or the positioning module (100).

The first battery (1540) may have a rated capacity and a rated output capacity enough to sustain the operation of the operator (1500) in the same manner as the second battery provided in the transport unit (1200). In particular, it should be noted that as the first battery (1540) is charged by the transport unit (1200) or the positioning module (100), it may also work as an inverter or a converter that converts the output voltage supplied by the second battery in proportion to the amount of power required by the operator (1500).

The status display module (1550) may display a driving status of the operator (1500), a control status of the transport unit (1200), or an operating status of the controller module 1520 to a user. It should be noted that the status display module (1550) is not limited to an LED device but may be embodied through various types of liquid crystal panels and the like.

In one embodiment, the traveling mode can be either the first traveling mode or the second traveling mode. In the above description, the first traveling mode and the second traveling mode refer to the traveling mode of the transport unit (1200). The first traveling mode is a mode in which the transport unit (1200) can be automatically induced to move to a specific point, and the second travelling mode may mean a mode where the traveling of the transport unit (1200) can be controlled by the operation of the user.

Referring to FIG. 13, the user uses the finger to push the controller module (1520) of the operator (1500), more specifically the lever with a round-shaped grip, in a forward direction, generating a control signal which is transmitted to the signal receiving unit (now shown) of the transport unit (1200) via a signal transmitter (not shown), and, in turn, the control signal may be transmitted to the driving unit. Accordingly, the driving unit rotates in a direction corresponding to the direction in which the lever moves in response to the control signal (for example, a clockwise direction), and the transport unit (1200) moves in the same direction (forward) with the lever which is moved by the rotational force of the driving unit. Meanwhile, the direction of the lever may be changed variously including toward the user's body, the right direction, and the left direction, etc., and consequentially the control signal transmitted to the signal receiving unit (not shown) may change. It is obvious that traveling can be controlled in accordance with the changed control signal.

Referring to FIG. 14, it can be seen that on one side of the operator (1500) is formed a connection jack (1530') protruding outward from the operator (1500), which is different from the first connecting groove (1530). Here, the connection jack (1530') may be inserted into the second connecting groove (1230) located at at least a part of the transport module (200), and the second connecting groove (1230) may be electrically connected with the second battery, so that the first battery (1540) in the operator (1500) can be charged by the power supplied from the second battery. Note that although the second connecting groove (1230) of the present specification is shown as being located at at least a part of the positioning module (100), the second connecting groove (1230) may be located at at least a part of a transport module (200).

Referring to FIG. 15, one or more connecting grooves (1530'') are grooved on one side (more specifically, the lower side) of the operator (1500). In this case, one or more connecting pins (1410a) protruding outward from one side of the first magnetic material (1410) may be inserted into the connecting groove (1530''). And in this case one or more connecting pins (1410a) may be electrically connected to the electric wire (1420), provided along with the wire (110). Since the electric wire (1420) can be electrically connected to the second battery (220) provided in the transfer unit (1200), the first battery (1540) in the operator (1500) can be charged with the power supplied from the second battery. In this case, since the first and second magnetic materials (1410) and (1510) can be kept in contact with each other by a magnetic force acting between the first and the second magnetic materials (1410) and (1510), the first battery (1540) of the operator (1500) continues to be charged regardless of an external shock.

The invention claimed is:
1. A positioning module, comprising:
a wire which is unwound from an inside of the positioning module by an external force;
a length calculation unit configured to calculate an unwinding length when the wire is unwound;
an angle calculation unit configured to calculate an unwinding angle when the wire is unwound; and
a location information calculation unit configured to calculate location information of at least some points on the wire by using the calculated unwinding length and the calculated unwinding angle.
2. The positioning module of claim 1, further comprising:
a speed calculation unit configured to calculate a speed value (V) using a moving distance (ΔL) of at least a point on the wire during a unit interval of time (ΔT).
3. The positioning module of claim 2, further comprises:
a control signal generator configured to generate a control signal by comparing the speed value, which is calculated by the speed calculated unit, with a threshold value set in advance.
4. The positioning module of claim 3, wherein comprising the control signal generator is configured to generate the control signal corresponding to a number of curves where the speed value exceeds the threshold value within a unit interval of time.
5. The positioning module of claim 4, wherein the control signal is one of an accelerate control signal, a decelerate control signal, and a stop control signal for a traveling device.
6. A driving control device of a carrier unit, comprising:
a wire which is unwound from an inside of a positioning module by an external force;
a transport unit equipped with a location measurement module;
a length calculation unit configured to calculate an unwinding length of the wire;

an angle calculation unit configured to calculating an unwinding angle of the wire, and control a traveling motion of the transport unit; and an operator configured to be detachable from a distal end of the wire, and control a travel of the transport unit.

7. The driving control device of claim 6, wherein the positioning module is configured to acquire location information of a distal end point of the wire based on the unwinding length of the wire and the unwinding angle of the wire, and indicate and save the location information in a time-ordered sequence in a coordinate system.

8. The driving control device of claim 6, wherein
the wire is electrically conductive; and
the positioning module is configured to supply power to the operator through the electrically conductive wire.

9. The driving control device of claim 6, wherein the transport unit is configured to move to a distal end point of one side of the wire which is calculated by the positioning module, under a first traveling mode set by the operator.

10. The driving control device of claim 6, wherein the transport unit is configured to receive a user's operation signal which is input to a controller module through the wire, and
wherein a traveling direction of the transport unit is controlled by the operation signal under a second traveling mode set by the operator.

* * * * *